United States Patent [19]

Willey

[11] Patent Number: 4,489,973
[45] Date of Patent: Dec. 25, 1984

[54] MOUNTING SYSTEMS FOR MOTORCYCLE WINDSHIELDS AND FAIRINGS

[76] Inventor: Barry A. Willey, 138 S. 8th Ave., Maywood, Ill. 60153

[21] Appl. No.: 458,551

[22] Filed: Jan. 17, 1983

[51] Int. Cl.³ .............................................. B62J 17/04
[52] U.S. Cl. ............................... 296/78.1; 280/289 S; 280/289 H; 296/84 A
[58] Field of Search ............................ 296/78.1, 84 A; 280/289 S, 289 H

[56] References Cited

U.S. PATENT DOCUMENTS 4,082,345  4/1978  Willey ................................ 296/78.1
4,166,650  9/1979  Saunders ........................... 296/78.1
4,335,876  6/1982  Westernoff ...................... 280/289 H

FOREIGN PATENT DOCUMENTS 195778  2/1958  Fed. Rep. of Germany ..... 296/78.1
197955  8/1924  United Kingdom ............... 296/78.1

Primary Examiner—Richard A. Bertsch
Attorney, Agent, or Firm—James T. FitzGibbon

[57] ABSTRACT

This invention relates generally to windshield assemblies and windshield mounting systems for motorcycles, and in particular, to a manually adjustable and readily removable windshield system primarily intended for use with motorcycles, scooters, and the like.

16 Claims, 9 Drawing Figures

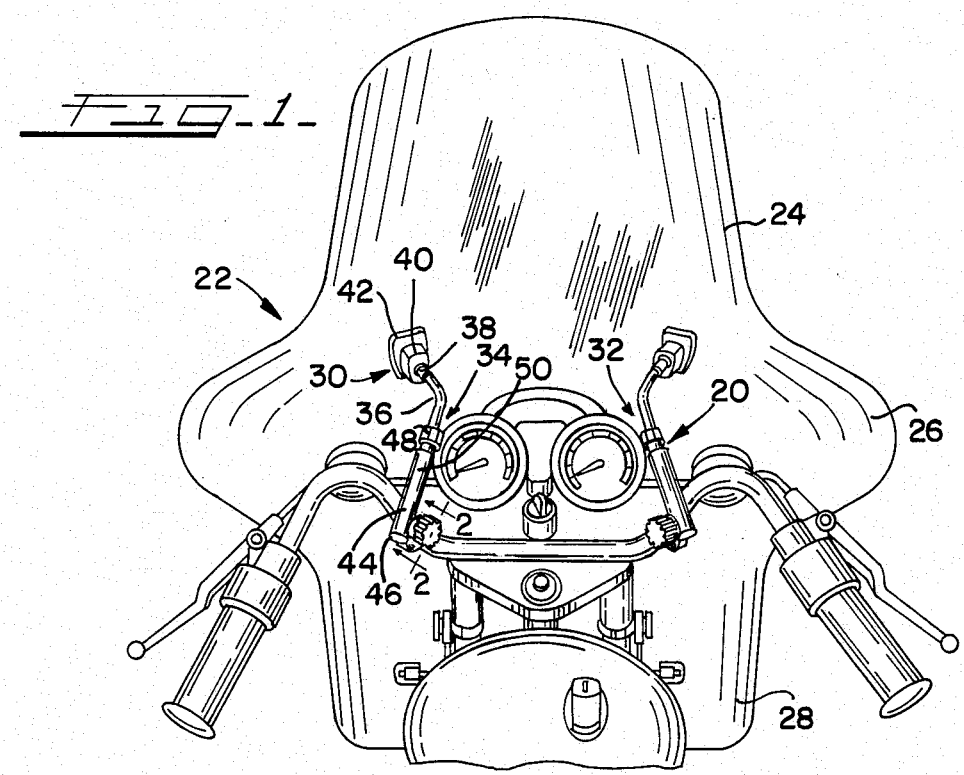
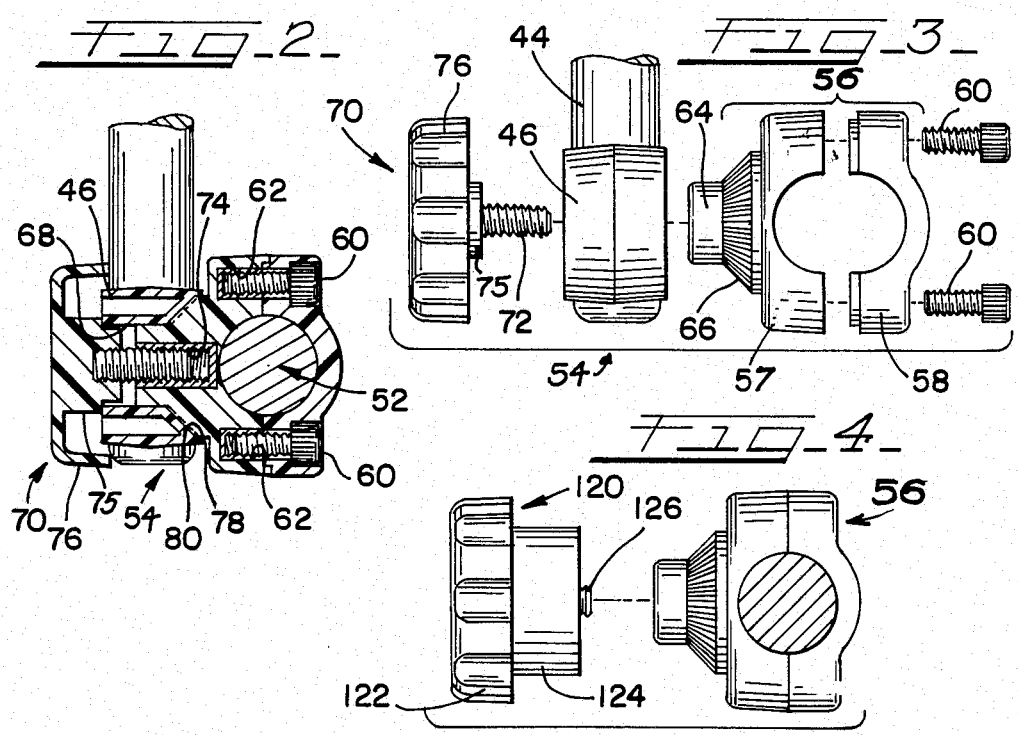

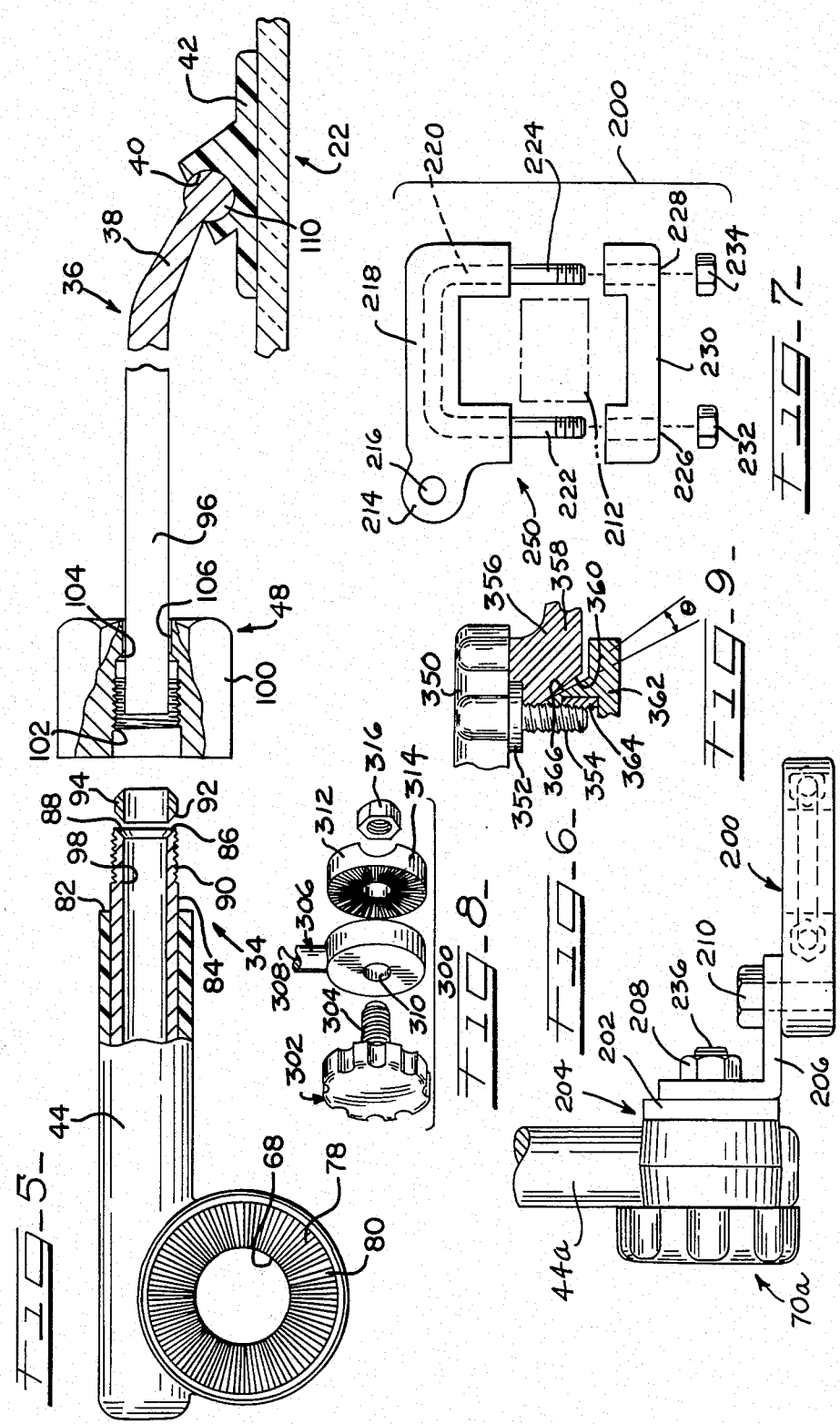

MOUNTING SYSTEMS FOR MOTORCYCLE WINDSHIELDS AND FAIRINGS

The present invention relates generally to windshield assemblies and windshield mounting systems for motorcycles, and in particular, to a manually adjustable and readily removable windshield system primarily intended for use with motorcycles, scooters, and the like.

It is now well accepted in the motorcycle industry that providing protection for the rider against strong winds and debris thrown up from the road, as by other vehicles and the like, is highly desirable. Whereas most motorcycles, scooters and the like now sold by the manufacturers are relatively complete as sold, in the sense of providing instrumentation and safety equipment, most motorcycles are not factory equipped with windshields or fairings. Most states have laws requiring the rider to wear goggles or helmet mounted eye protection if the cycle does not have a windshield or fairing. Needless to say, improved comfort is another important aspect of shields and fairings. Thus, a strong aftermarket exists for products of these types.

Basically, these products generally fall into one of two categories. The first is the so-called simple windshield, which is usually mounted with respect to the handlebars of a motorcycle or with respect to other steerable portions of the front end of the cycle so as to turn therewith. A windshield is usually thought of as a transparent shield which is curved in a single plane only, that is, it is a section of a cylinder or the like, having a top portion through which the viewer looks to see objects lying ahead of the intended movement path of the cycle.

A modification or improvement to the windshield is a so-called fairing, which may be though of generally as being a more elaborate form of windshield, contoured so as to have curves lying in more than one plane. Fairings vary in type, both as to their complexity and intended function, as well as to their method of mounting. So-called touring fairings often include a body portion which is manufactured separate from the windshield portion proper, and which incorporates storage compartments, turn signals, and sometimes means for accommodating a ardio or the like. Fairings such as this are customarily mounted on the frame of the motorcycle and are hence referred to as "frame mount" fairings. Other fairings, a number of which comprise a single sheet of transparent material, such as acrylic, polycarbonate or modified cellulose resins, may be contoured in several planes, and are occasionally frame mounted, but are normally mounted with respect to the fork or the handlebars of the cycle and are hence often referred to as "handlebar mount" or "fork mount" fairings.

While it is universally accepted that fairings serve an important purpose in motorcycles, including increased visibility, protection against poor weather, and protection against wind buffeting and objects thrown up from or along the road or the like, as well as protection against airborne insects and other hazards, two principle drawbacks still exist with respect to most fairings. The larger and more permanent the fairing, the larger and less wieldy the motorcycle becomes, particularly when used at slow speeds and for around town use or the like. Likewise, large fairings on the motorcycle occupy more space and make the cycle more difficult to load and unload from trailers, for example, and to be moved about when stored or brought in for dealer service or the like. Many of the hazards protected against by a windshield or fairing are by far more common when the cycle is being operated over the open road, or otherwise at high speed.

A second drawback is that the moderatly priced styles of fairings are sometimes considered to detract from the sporty motorcycle image and appearance desired by the rider.

In view of the unquestioned advantages of windshields and fairings, particularly moderately priced shields or fairings for use at higher speeds, together with the fact that there are many times when such riders do not need or prefer to have a cycle equipped with such a fairing, there has arisen a need for a motorcycle fairing which may be readily placed in position of use on a motorcycle, and equally easily removed for local riding or for sporting use or the like. With such construction, there is also a desire and need for a unit which can be removed without compromising any safety or construction features of the motorcycle. Because the general concept of a removable fairing implies convenience, it is of paramount importance to provide a fairing which can be removed without the use of tools, even hand tools, and which can be reinstalled without using such tools. A desirable fairing would be a readily removable fairing of the type just described, in addition to one which would insure that, when temporarily removed, it could be reinstalled without the need for making elaborate adjustments.

In view of the foregoing need for a readily removable and replaceable windshield, it is an object of the present invention to provide an improved windshield for motorcycles, scooters, and the like.

Another object of the present invention is to provide a motorcycle windshield having the advantages of existing windshields, and possessing the further advantages of repeatable ready removability and replacement without damage.

A further object of the present invention is to provide a motorcycle windshield having a system providing for ready removal and replacement of the shield portion, with or without removal of a portion of the support braces positioning the unit, all of which may be accomplished without the use of power tools or even hand tools.

A still further object of the invention is to provide a windshield which may be readily installed in position of use and thereafter be removed and reinstalled when desired, without changing essential features of the adjustment thereof.

Yet another object of the invention is to provide a windshield mounting system having a novel brace construction wherein certain portions of the fairing mount are adapted to remain permanently with the motorcycle, and other portions are adapted to be removed along with the shield, also without the use of hand tools.

A still further object of the invention is to provide an improved so-called universal or widely adaptable mounting system for cycle shields and fairings.

Another objection of the invention is to provide a windshield mounting system which is as secure as a tool mounted system, and which includes portions permanently mounted to the cycle with the use of tools but which further includes other portions readily removable and replaceable without requiring even the use of hand tools for this purpose.

A further object of the invention is to provide a mounting system which includes desirable prior art safety features, including features adapted to protect the rider in the event he is propelled forward by a collison or the like.

A still further object of the invention is to provide a windshield of the foregoing type which may be readily removed and replaced in the event of breakage or the like.

An even further object of the invention is to provide a mounting mechanism which may be secured to a variety of different handlebar styles and which is adapted for ease of angular adjustment of the brace portions thereof by reason of including an angularly adjustable section which is retained in axial alignment with a handlebar clamp or other portion of the front fork assembly, or even the frame, to facilitate adjustment without disassembly.

Still another object of the invention is to provide a mounting bracket assembly for a motorcycle windshield which, with the windshield removed, provides inconspicuous and/or streamlined brackets, and which protects the exposed portion of the mechanism from possible damage during use when mating parts are removed.

Another object of the invention is to provide a system which contains a minimum number of parts and which therefore requires a minimum total of different pieces or "part numbers" to be kept in stock by dealers.

A still further object of the invention is to provide a mounting system which is compatible with the wide variety of handlebar units now on the market.

Yet another object of the invention is to provide a windshield or fairing mount system which is adaptable for handlebar mounting, but which is also adaptable for mounting on other steering parts of the motorcycle, such as the fork tubes or the upper triple clamp, for example, or on non-steerable parts of the cycle, such as the frame or tank.

The foregoing and other objects and advantages of the invention are achieved in practice by providing specially designed fairing or shield mounting hardware including a removable handlebar engaging clamp portion, an intermediate, axially and angularly adjustable upright bracket portion, means forming a part thereof permitting length adjustment, means for securing the brace in a position of use through a range of angular adjustment, controlled by a manually operated locking mechanism, with such parts being adapted to cooperate with other portions of the shield for readily removable mounting thereof.

The invention also achieves its objects by providing a windshield cooperating with such mounting system, including a windshield having a lower mounting system which is adapted to be removed from the front suspension parts of the motorcycle by a hand- or tool- manipulated process which leaves portions of the mounting hardware associated with the motorcycle and the remaining portions associated with or affixed to the shield.

The manner in which the foregoing and other objects and advantages of the invention are achieved in practice will become more clearly apparent when reference is made to the following detailed description of the drawings set forth by way of example, and shown in the accompanying drawings, wherein like reference numbers indicate corresponding parts throughout.

BRIEF DESCRIPTION OF THE DRAWINGS

FIG. 1 is an elevational view, taken from the rear of a motorcycle and looking forwardly therefrom, showing a motorcycle windshield secured in place by the novel mounting hardware of the invention;

FIG. 2 is an enlarged scale vertical sectional view, with portions broken away, taken along line 2—2 of FIG. 1 and showing a portion of the motorcycle handlebars, the handlebar clamps, as well as a portion of the upper shield brace and the mechanism for angular adjustment thereof;

FIG. 3 is an exploded elevational view of portions of the mounting hardware unit of FIG. 2;

FIG. 4 is an exploded view of the handlebar clamp with the shield brace removed and showing a form of protective cover therefor; and FIG. 5 is a plan view, partly in elevation and partly in section, showing in exploded relation, constructional details of the shield brace of the invention.

FIG. 6 is a plan view showing a modified form of mounting system embodying the invention;

FIG. 7 is an elevational view of the handlebar bracket portion of the mounting system of FIG. 6;

FIG. 8 is an exploded perspective view of a further modified form of mounting system embodying the invention; and FIG. 9 is a fragmentary sectional view of a still further form of adjustment mechanism embodying the invention.

DESCRIPTION OF THE PREFERRED EMBODIMENTS OF THE INVENTION

While it will be understood that the principles of the invention are applicable to different forms of shields, and may be applied in principle to both the upper and lower portions of the windshield, may also be more or less inclined in one or more planes, and may be applied with equal advantage to scooters or bicycles and the like, as well as motorcycles, a description of the preferred embodiments of the invention will be given wherein the vehicle is a conventional, two wheeled motorcycle, wherein the fairing is a single piece transparent plastic or like screen having upper, lower and intermediate portions, and wherein the shield is adapted for breakaway release of at least an upper portion thereof when struck from the rear to provide additional safety factor.

Referring now to the drawings in greater detail, FIG. 1 shows the invention to be embodied in mounting hardware generally designated 20 for securing a cycle windshield generally designated 22, and having a transparent upper shield portion 24, a generally intermediate shield portion 26, and a lower shield portion 28. In typical use, and as shown in FIG. 1, the shield utilizes a "four point" mounting system, having the upper portion thereof mounted approximately at the point where in the intermediate shield portion 26 which protects the hands of the rider joins the upper or transparent, view-through portion of the shield 24.

According to the invention, left and right hand, substantially identical shield mounting assemblies 30, 32 are provided and shown to include a telescoping brace assembly 34 which, in turn, includes a forwardly directed shield support portion in the form of a support rod 36, having a forward end portion 38 in the form of a knob or the like received within a socket 40 on a shield mounting pad 42, which is in turn adhesively or otherwise affixed to the shield 22. The forwardly directed support rod portion 36 of the brace 34 is adapted for telescopic movement within a hollow tube 44 having a lowermost end portion (FIGS. 2, 3) in the form of a mounting eye 46.

An adjusting and locking nut 48 is secured over the axially outermost end portion 50 of the tube 44 for controlling movement of the rod 36. As best shown in FIGS. 2-4, the hardware assemblies 20 each include a handlebar clamp and brace positioning portion 54.

Referring now to FIGS. 2 and 3, there is shown a handlebar 52 which, for purposes of illustration, is shown as being solid, with the handlebar clamp and brace positioning assembly 54 being disposed thereover in locked relation.

As shown in FIGS. 2 and 3, the assembly 54 includes a clamping body 56 which is in turn comprised of a positioning body 57 and a cap portion 58 secured to the body 57 by fastening means in the form of socket head cap screws 60, received within tapped opening in reinforcing metal inserts 62 in the body 57. The body 57 in turn includes a generally cylindrical journal half 64 extending axially outwardly from a tapering, radially serrated brace positioning portion 66. As shown in FIGS. 2 and 3, when the eye portion 46 of the tube 44 is axially aligned for assembly, the inner diameter cylindrical surface 68 of the eye portion 46 fits over the journal half 64 with an axial slip fit; this positions the eye 46 against radial movement, but permits relative rotation when the parts are loosely fitted. The bracket portion of the assembly also includes a brace fastener generally designated 70, and shown to include a threaded shank portion 72 which is received within a tapped opening 74 in the clamp body 57, a journal half portion 75 of the same size as the journal half 64, and a knob or hand gripping portion 76.

By reference to FIGS. 2 and 3, it may be seen that when the eye 46 of the brace 34 is positioned as shown, the brace is in a preliminary location. The fastener 70 is then inserted as shown in FIG. 2, and manipulated until the brace 34 is properly journaled. Then the desired angular adjustment of the brace is made, and the knob 76 is firmly tightened by hand. At this point, cooperating splined or serrated surfaces 66 on the body 57 and counterpart splined or serrated surface 78 (FIG. 2) on a tapered shoulder 80 (see also FIG. 5) of the eye 46 mutually engage each other in a locking relation to prevent relative rotation. Consequently, the lower end of the brace assembly 34 may be positioned angularly wherever desired, merely by a hand adjustment.

In the form of mounting systems shown in FIGS. 1-4, the parts permitting angular adjustment are situated adjacent the handlebars, and a handlebar mounting system is shown. However, in keeping with the invention, these parts might be mounted to the upper triple clamp, to the fork tube or other steerable portion of the motorcycle.

It will likewise be understood that these parts, suitably modified, may be mounted to the frame, the tank or other fixed part of the cycle. Still further, the illustrated parts might be reversed or otherwise rearranged so that angular adjustment and/or removal could take place adjacent the shield instead of adjacent the mounting area.

In the case of smaller, simpler shields, it is sometimes more convenient to allow angular adjustment to take place near the shield, especially where the shield mounting hardware is positioned by only two mounting brackets instead of four.

Referring now to FIG. 5, additional details of the brace 34 are shown. This unit, in addition to having the cylindrical inner surface 68 and the shoulder 80 with the serrations 78, forming parts of the mounting eye portion 46 of the brace 34, also includes an inner brace insert sleeve 84, received snugly inside the outer tube 44. The outermost end of the insert sleeve 84 is defined by an end surface 86, an inwardly extending taper 88, and a threaded end portion 90. The tapered surface 88 cooperates in use with a counterpart taper 92 on a compression sleeve 94 to locate the shank 96 portion of the rod 36, as will appear.

When the shank 96 of the rod 36 is received snugly within the bore 98 of the insert sleeve 84, and positioned where desired, the nut 48 may be tightened to secure the parts in locking engagement. The nut 48, in addition to outer flank surfaces 100, includes an inwardly directed threaded portion 102, a tapered surface 104 for engaging the taper on the other end of the compression sleeve 94, as well as a smaller diameter passage 106 permitting the shank 96 of the rod 36 to move therethrough.

From FIG. 5, it will be seen that telescoping adjustment of the rod 36 within the sleeve 44 is accomodated by a pinching or compression sleeve arrangement of relatively conventional construction. FIG. 5 also shows that the rod 38 includes an angularly offset forward end 108, terminating in ball 110 received within a socket 110 on the windshield mounting pad 42, which is in turn attached to the shield 22. The inclined portion 38 permits a further range of shield adjustment positions, inasmuch as the ball 110 may rotate about the axis of the rod shank 96.

Referring now to FIG. 4, the end cap assembly 56 is shown to be optionally provided with a protective cap 120 having an outer knob surface 122, an enlarged sleeve portion 124 and a threaded shank 126. When the locking fastener 70 is removed, it may be desirable to protect the serrations 66 by covering them with a protective fastener such as the unit 120, although this is not strictly necessary.

The present invention is also adaptable for use with handlebars which do not have a circular cross-section; many manufacturers are now offering motorcycles with handlebars of different cross-sections such as square or rectangular cross-sections. The present invention is readily adaptable for use with such handlebars.

Thus, in FIGS. 6 and 7, a modified form of assembly is shown wherein the tube portion 44a of a handlebar brace is secured by a modified form of handlebar clamp assembly 200. In this unit, a handlebar clamp assembly generally designated 200 is secured to an end portion 202 of a modified form of clamp body 204 by an angular bracket 206. The bracket is secured, as by fasteners 208, 210 respectively, to the end 202 of the body 204 and to the clamp 200.

As shown in FIG. 7, the clamp assembly 200 includes a mounting ear 214 having an eye 216 therein for passage of the fastener 210 and includes a U-shaped principal body 218 having a U-bolt 220 embedded therein. The two end portions 222, 224 of the U-bolt extended outwardly from the body 218 and pass in use through openings 226, 228 in the cap 230 of the clamp. When a square or rectangular cross-section handlebar is used, the bar clamp assembly 200 is positioned over it as shown, with the nuts 232, 234 then being tightened to snugly clamp the handlebar 212 between the body and the cap 218, 230.

The interior aspects of the clamp body 204 are the same as those of their counterparts 64, 66 in FIG. 3, differing only therefrom in that the stud 236 extends axially outwardly from the body for attachment of a bracket instead of itself constituting an entire clamp unit.

FIGS. 6 and 7 are merely illustrative of constructions wherein the handlebar is of a non-circular shape. Thus, it will be understood that the hollow bar clamp may comprise additional adapters, permitting continued use of the novel angular adjustment system parts without requiring an inventory of different pieces for use with models of motorcycles having such handlebars.

FIG. 8 is an exploded perspective view of an alternate form of mounting unit 300 made according to the invention. In this form, a knob 302 having threaded shank 304 is shown to be associated in use with a brace 306 having a stem 308 (shown broken away) and including a central aperture 310 therein. The brace 306 provides angular adjustment with an associated portion 312 which is adapted with other hardware (not shown) to be received over a part of the motorcycle. The difference between the assembly shown in FIGS. 2-5 and FIG. 6, for example, and that of FIG. 8 is that in the construction of FIG. 8, the radial teeth or serrations 314, which also have counterparts not shown, on the brace 306 are purely radial, but lie in a flat plane. A captive nut 316 is shown as one example of means for receiving the threaded portion 304 of the fastener.

In keeping with the objects of the invention, the knob 302 is operable by hand and does not require tools.

Referring now to FIG. 9, a fragmentary sectional view, another form of mounting system providing angular adjustment is shown. In this illustration, a hand knob 350 has a shank portion 352 terminating in a threaded end 354 with the shank 352 extending through the body 356 of a brace 358 having a frusto-conical end face surface 360. The part to which the end 356 is secured by the fastener 350 is a portion of a bracket 362 which includes a threaded insert 364 of a hard material. The member 362 includes as one end face portion thereof a tapered frusto-conical surface 366. In this construction, the two parts 356 and 362 are preferably made from aluminum or brass. As shown, there is a slight difference in the angles of the respective frusto-conical surfaces 360, 366 which are urged into engagement with each other by the locking action of the fastener 350. This action is similar to a so-called Morse taper used in machine tools and other applications, except that the cone angles are relatively flatter. While the angular difference ($\theta$ in FIG. 9) between the bevels on the respective surfaces 360, 368 is exaggerated for illustrative purposes, it it will be understood that, in reality, the angular difference is slight, usually amounting to between 1° to 2° up to 7°. Such a taper, using suitable materials will provide a good adjusting and locking action.

It will thus be seen that the present invention provides a novel cycle windshield mounting assembly having a number of advantages and characteristics including those pointed out above and others which are inherent in the invention. Several preferred embodiments of the invention having been described by way of illustration, it is anticipated that changes and modifications of the described cycle windshield mounting assembly will occur to those skilled in the art and that such changes and modifications may be made without departing from the spirit of the invention or the scope of the appended claims.

I claim:

1. A windshield mounting assembly for a motorcycle windshield or the like, said assembly comprising, in combination, a clamp portion adapted to be snugly received over the handlebar portion of an associated cycle, said clamp portion also including means for positioning a portion of a windshield brace assembly for rotation through a range of angular adjustment positions, a shield brace assembly having one end portion adapted to be removably positoned with respect to said clamp, said end also being arranged to prevent radial movement of said one brace end when said brace assembly is positioned for adjustment, a fastener adapted to cooperate with said clamp in securing said one brace end, said shield brace assembly further including cooperating portions also arranged for movement through a range of adjustment positions, and means for locking said cooperating portions to said brace in a desired position of adjustment, one of said cooperating portions having means on a free end thereof for attachment to a portion of a cycle windshield, said one brace end and said clamp having interlockable means for preventing movement of said brace from a desired position of angular adjustment when said brace end and said clamp are fastened together, said fastener also being constructed and arranged for hand tightening so as to lock said brace end to said clamp in said desired position of angular adjustment.

2. A windshield mounting assembly as defined in claim 1, wherein said clamp portion further includes means for at least partially journalling a portion of said windshield brace assembly for rotation through said range of angular adjustment position.

3. A windshield mounting assembly as defined in claim 1, wherein said cooperating portions also arranged for movement through said range of adjustment positions comprise inner and outer shield brace elements arranged for telescoping movement with respect to each other.

4. A windshield mounting assembly as defined in claim 1 wherein said interlockable means comprises cooperating serrations lying along frusto-conical surfaces of said brace end and a portion of said clamp, respectively.

5. A windshield mounting assembly as defined in claim 4 wherein said interlockable radially extending cooperating serrations on a portion of said brace end and a portion of said clamp, respectively.

6. A windshield mounting assembly as defined in claim 1 wherein said interlockable means comprise first and second parts having opposed, annular beveled surfaces, said angular beveled surfaces having slightly different bevel angles so as to provide a snug fit when said first and second parts are urged into closely associated relation.

7. A windshield mounting assembly as defined in claim 1, wherein said clamp portion includes a first portion adapted to cooperate with said one end portion of said brace assembly, a second portion acting as a cap, and fasteners to hold said first and second portions together.

8. A windshield mounting assembly for a motorcycle windshield or the like, said assembly comprising, in combination, a clamp portion adapted to be snugly received over a portion of an associated cycle, said clamp also including means for at least partially journaling a portion of a windshield brace assembly for rotation through a range of positions, a shield brace assembly having one end portion adapted to be removably received axially over said journaling portion of said clamp to prevent radial movement of said one brace end, a fastener adapted to cooperate with said clamp in securing said one brace end, said shield brace assembly further including cooperating portions also arranged for movement through a range of positions, means for locking said cooperating portions of said brace in a desired position of adjustment, one of said cooperating portions having means on a free end thereof for attachment to a portion of a cycle windshield, said one brace end and said clamp having interlockable means for preventing movement of said brace from a desired position of angular adjustment when said brace end is snugly held between said fastener and said clamp, said fastener also including means thereon for hand tightening so as to lock said brace in said desired position of angular adjustment.

9. A windshield mounting assembly for a motorcycle windshield or the like, said assembly comprising, in combination, a handlebar clamp portion adapted to be snugly received over a portion of the handlebar of an associated cycle, said handlebar clamp also including means for at least partially journaling a portion of a windshield brace assembly for rotation through a range of positions, a shield brace assembly having one end portion adapted to be removably received axially over said journaling portion of said clamp to prevent radial movement of said one brace end, a fastener adapted to cooperate with said clamp in securing said one brace end, said shield brace assembly further including cooperating portions arranged for telescoping movement between extended, withdrawn, and intermediate positions, means for locking said cooperating portions of said brace in a desired position of adjustment, one of said cooperating portions having means on a free end thereof for attachment to a portion of a cycle windshield, said one brace end and said clamp having interlockable means for securing said brace in a desired position of angular adjustment, said one end of said brace and a portion of said clamp having cooperating means to prevent movement of said one end of said brace when said brace end is locked between said fastener and said clamp, said fastener also including means thereon for hand tightening so as to lock said brace in said desired position of angular adjustment.

10. A windshield mounting assembly as defined in claim 9 wherein said handlebar clamp portion and said means for journaling said portion of said brace assembly comprise a handlebar clamping body, a stub journal, and a body cap unit.

11. A windshield mounting assembly as defined in claim 9 wherein said means for at least partially journaling said portion of said brace include a cylindrical stub shaft adapted to extend at least half way through said one end portion of said windshield brace so as to provide mechanical support therefor.

12. A windshield mounting assembly as defined in claim 9 wherein said interlockable means on said brace end and said clamp comprise a plurality of radially extending serrated surfaces constructed and arranged so as to interlock with one another.

13. A windshield mounting assembly as defined in claim 9 wherein said interlockable means on said brace end and said clamp comprise cooperating serrated surfaces lying respectively on frusto-conical surface portions of said clamp and said brace end.

14. A windshield mounting assembly as defined in claim 9 wherein said means for locking said portions of said brace in said position of adjustment comprise a compression sleeve and lock nut.

15. A windshield mounting assembly as defined in claim 9 wherein said means on said free end of said brace portion for attachment to a portion of a cycle windshield comprises the ball portion of a ball-and-socket mounting arrangement.

16. A windshield mounting assembly as defined in claim 9 wherein said fastener comprises a composite unit having a threaded shank and an enlarged diameter head portion, said head portion having a reduced diameter stub thereon for at least partially journalling a portion of said brace end.

* * * * *